(12) United States Patent
Jo et al.

(10) Patent No.: US 12,214,731 B2
(45) Date of Patent: Feb. 4, 2025

(54) ON-BOARD CAMERA DEVICE

(71) Applicant: SUBARU CORPORATION, Tokyo (JP)

(72) Inventors: Keirai Jo, Tokyo (JP); Toshiyuki Inbe, Tokyo (JP); Shinya Tomita, Tokyo (JP); Hideo Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 135 days.

(21) Appl. No.: 17/343,458

(22) Filed: Jun. 9, 2021

(65) Prior Publication Data
US 2021/0387579 A1 Dec. 16, 2021

(30) Foreign Application Priority Data
Jun. 12, 2020 (JP) .................... 2020-102259

(51) Int. Cl.
*B60R 11/04* (2006.01)
*B60S 1/02* (2006.01)
(Continued)

(52) U.S. Cl.
CPC ............ *B60R 11/04* (2013.01); *B60S 1/026* (2013.01); *G03B 11/045* (2013.01); *G03B 17/55* (2013.01);
(Continued)

(58) Field of Classification Search
CPC . B60R 11/04; B60R 2300/8053; B60S 1/026; G03B 11/045; G03B 17/55; H05B 3/12; H05B 3/84
(Continued)

(56) References Cited

U.S. PATENT DOCUMENTS

2015/0015713 A1* 1/2015 Wang .............. H04N 23/55
  348/148
2016/0119509 A1* 4/2016 Wato .............. G06V 20/56
  348/148
(Continued)

FOREIGN PATENT DOCUMENTS

JP  2016-078807 A  5/2016

*Primary Examiner* — Joseph G Ustaris
*Assistant Examiner* — Jimmy S Lee
(74) *Attorney, Agent, or Firm* — MCGINN I.P. LAW GROUP, PLLC

(57) ABSTRACT

An on-board camera device includes a camera unit, a hood member, a thermally conductive member, a heater device, and a temperature measurement element. The camera unit captures an image of an ambient environment through a window glass of a vehicle. The hood member blocks an unnecessary light beam from outside and suppresses background reflection on the window glass. The thermally conductive member is fixed to the hood member to thermally contact with the window glass. The heater device contacts with the thermally conductive member and removes dew condensation and fog adhering to the window glass. The temperature measurement element is provided at the heater device and partly contacts with the thermally conductive member. The temperature measurement element detects a temperature state of the heater device during operation of the heater device and a temperature state of the window glass through the thermally conductive member during non-operation of the heater device.

18 Claims, 4 Drawing Sheets

(51) Int. Cl.
*G03B 11/04* (2021.01)
*G03B 17/55* (2021.01)
*H05B 3/12* (2006.01)
*H05B 3/84* (2006.01)

(52) U.S. Cl.
CPC ................ *H05B 3/12* (2013.01); *H05B 3/84* (2013.01); *B60R 2300/8053* (2013.01)

(58) Field of Classification Search
USPC ........................................................ 348/148
See application file for complete search history.

(56) References Cited

U.S. PATENT DOCUMENTS

| | | | |
|---|---|---|---|
| 2016/0272332 A1* | 9/2016 | Ishida | B64C 1/1476 |
| 2017/0240138 A1* | 8/2017 | Mori | H04N 7/183 |
| 2019/0176762 A1* | 6/2019 | Ooji | H05B 3/84 |
| 2019/0208583 A1* | 7/2019 | Kasetani | H05B 3/84 |
| 2020/0059583 A1* | 2/2020 | Tamura | G02B 7/02 |
| 2020/0191620 A1* | 6/2020 | Kasai | B60R 11/04 |
| 2021/0094512 A1* | 4/2021 | Kovach | B60R 11/04 |

* cited by examiner

ON-BOARD CAMERA DEVICE

CROSS-REFERENCE TO RELATED APPLICATIONS

The present application claims priority from Japanese Patent Application No. 2020-102259 filed on Jun. 12, 2020, the entire contents of which are hereby incorporated by reference.

BACKGROUND

The disclosure relates to an on-board camera device that is to be mounted in a vehicle, that captures an image through a window glass, and that has a defogging function of removing dew condensation, fog, and the like adhering to a glass surface at a camera front part.

For recent vehicles, such as an automobile, there have been proposed various driving support devices, and such driving support devices have been practically used. The driving support devices use a camera (hereinafter referred to as the on-board camera device) mounted in a vehicle, capture an image of an ambient environment of the vehicle, subject the acquired image to various types of processing, and utilize the image as information for supporting a driving operation of a driver.

In general, an on-board camera device applied to such a support device is installed in the interior of a vehicle and capture an image of an ambient environment of the vehicle through a window glass, such as a windshield and a rear glass, of the vehicle.

In a vehicle, such as an automobile, a window glass may be fogged as a result of generation of dew condensation and the like on a glass surface when the outdoor air temperature is lower than the temperature of the vehicle interior (for example, in winter or the like) or when the humidity of the vehicle interior is high compared with the outside of the vehicle.

When an on-board camera device that captures an image of an ambient environment through a window glass is used, if fog is generated on the window glass at a camera front part, the fog may block view and disable acquisition of a clear image.

Thus, temperature information in the interior of a vehicle, around devices installed in the vehicle, or around a window glass may be acquired to detect whether the window glass of the vehicle is fogged. For example, the on-board camera device disclosed in Japanese Unexamined Patent Application Publication (JP-A) No. 2016-078807 is configured such that a temperature sensor is installed near the on-board camera device, the temperature state of the on-board camera device is detected, and whether fog is generated on a glass is determined using an image acquired by the on-board camera device.

SUMMARY

An on-board camera device according to an aspect includes a camera unit, a hood member, a thermally conductive member, a heater device, and a temperature measurement element. The camera unit is configured to capture an image of an ambient environment through a window glass of a vehicle. The hood member is configured to block an unnecessary light beam from outside of an imaging view of an imaging lens of the camera unit and suppress background reflection on the window glass. The thermally conductive member is made of a highly thermally conductive material and fixed to an outer surface of the hood member to be in thermal contact with the window glass. The heater device is fixed in contact with an outer surface of the thermally conductive member and has a defogging function of removing dew condensation and fog adhering to a surface of the window glass at a front part of the camera unit. The temperature measurement element is provided at a substantially center part of the heater device and includes a portion that is disposed in contact with the thermally conductive member. The temperature measurement element is configured to detect a temperature state of the heater device during operation of the heater device and detect a temperature state of the window glass transmitted through the thermally conductive member during non-operation of the heater device.

BRIEF DESCRIPTION OF THE DRAWINGS

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

DETAILED DESCRIPTION

In a configuration of an existing on-board camera device disclosed in, for example, JP-A No. 2016-078807 presented above, a temperature sensor is installed near the on-board camera device. Thus, although detecting the temperature state of the on-board camera device itself is easy, the configuration is not suitable for detecting the temperature of a glass itself.

For example, there may be employed a configuration in which the temperature state of the glass itself is detected with another temperature sensor additionally installed at a part around the glass. However, since the temperature sensor that detects the temperature state of the glass is newly installed in addition to the temperature sensor for detecting the temperature state of devices in this configuration, manufacturing costs may increase in this configuration due to a plurality of the temperature sensors.

It is desirable to provide an on-board camera device that is configured to be mounted in a vehicle and capture an image through a window glass, that has a defogging function of removing dew condensation, fog, and the like adhering to a glass surface at a camera front part, and that is capable of confirming the temperature state of the window glass of the vehicle and the temperature state of the on-board camera device by using a single temperature sensor and capable of contributing to a reduction in manufacturing costs.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
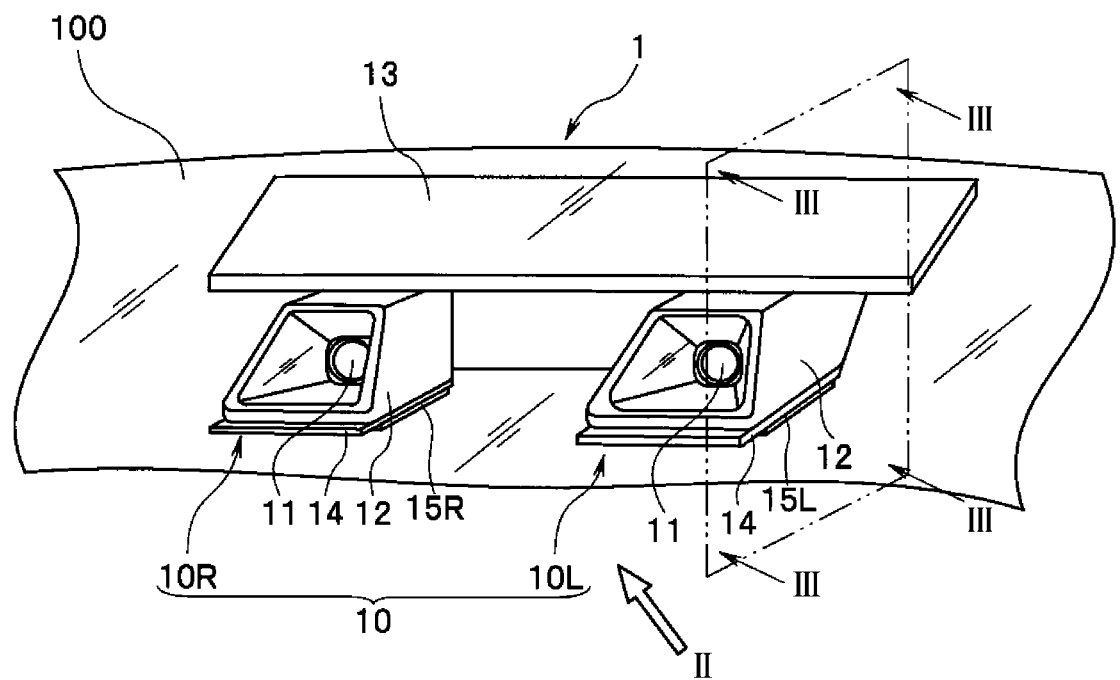
FIG. 1 is a schematic front perspective view of an on-board camera device according to an embodiment of the disclosure.
Figure 2:
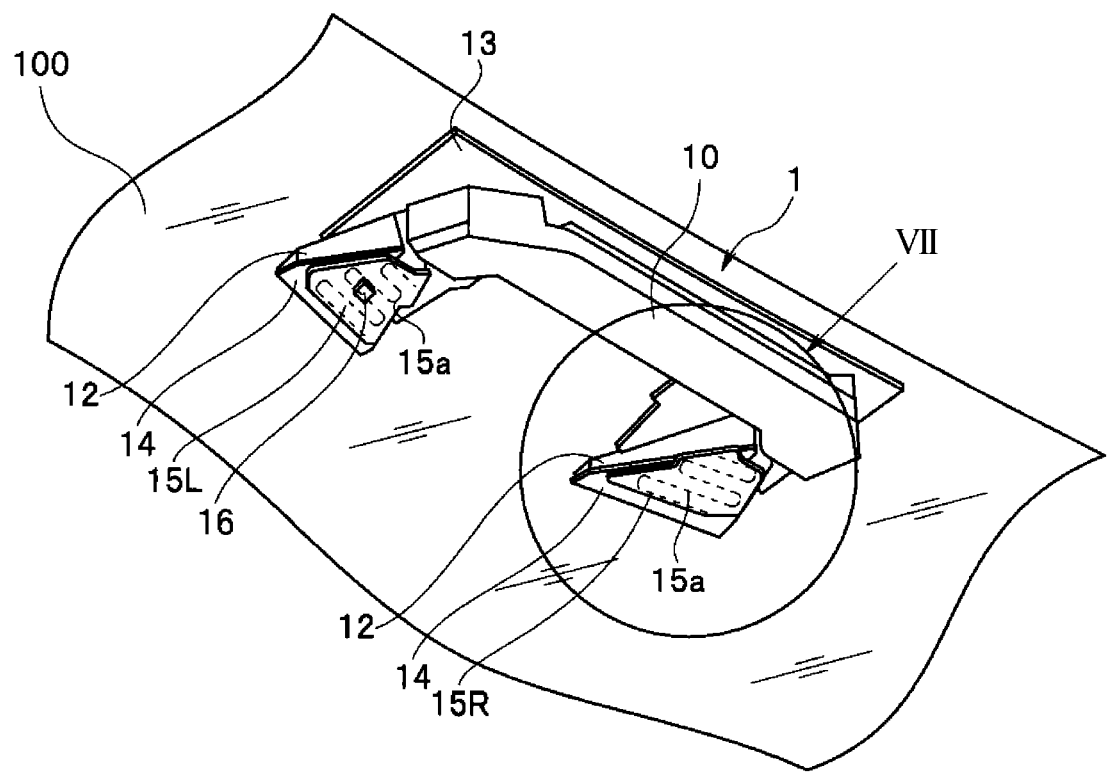
FIG. 2 is a schematic perspective view of the on-board camera device as viewed in the arrow II direction in FIG. 1.
Figure 3:
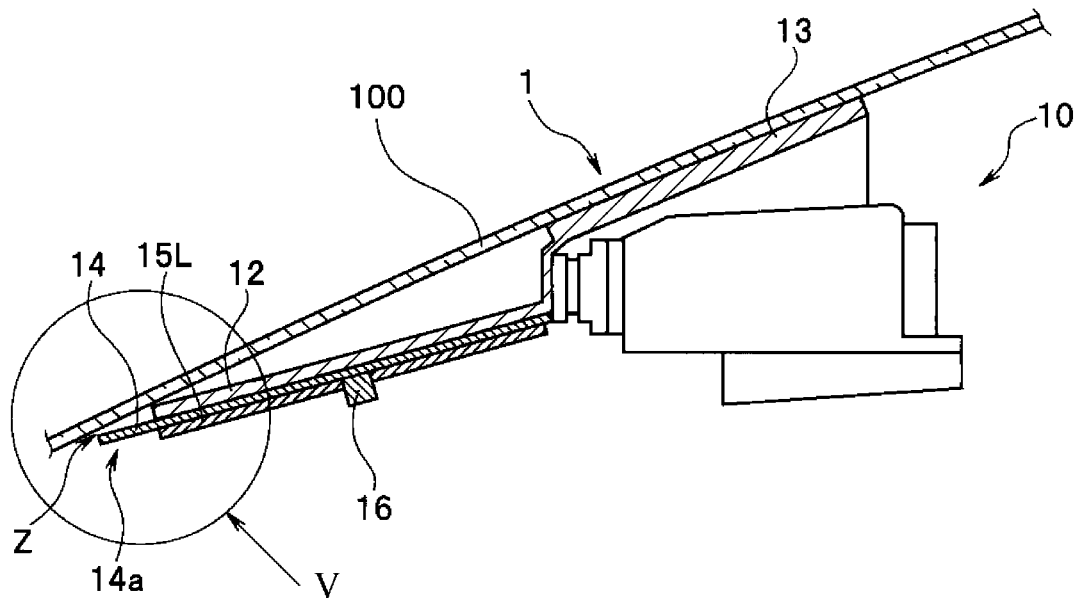
FIG. 3 is a partially enlarged sectional view of a section of an imaginary plane (the plane indicated by the two-dot chain line) in FIG. 1 as viewed in the arrow III direction.
Figure 4:
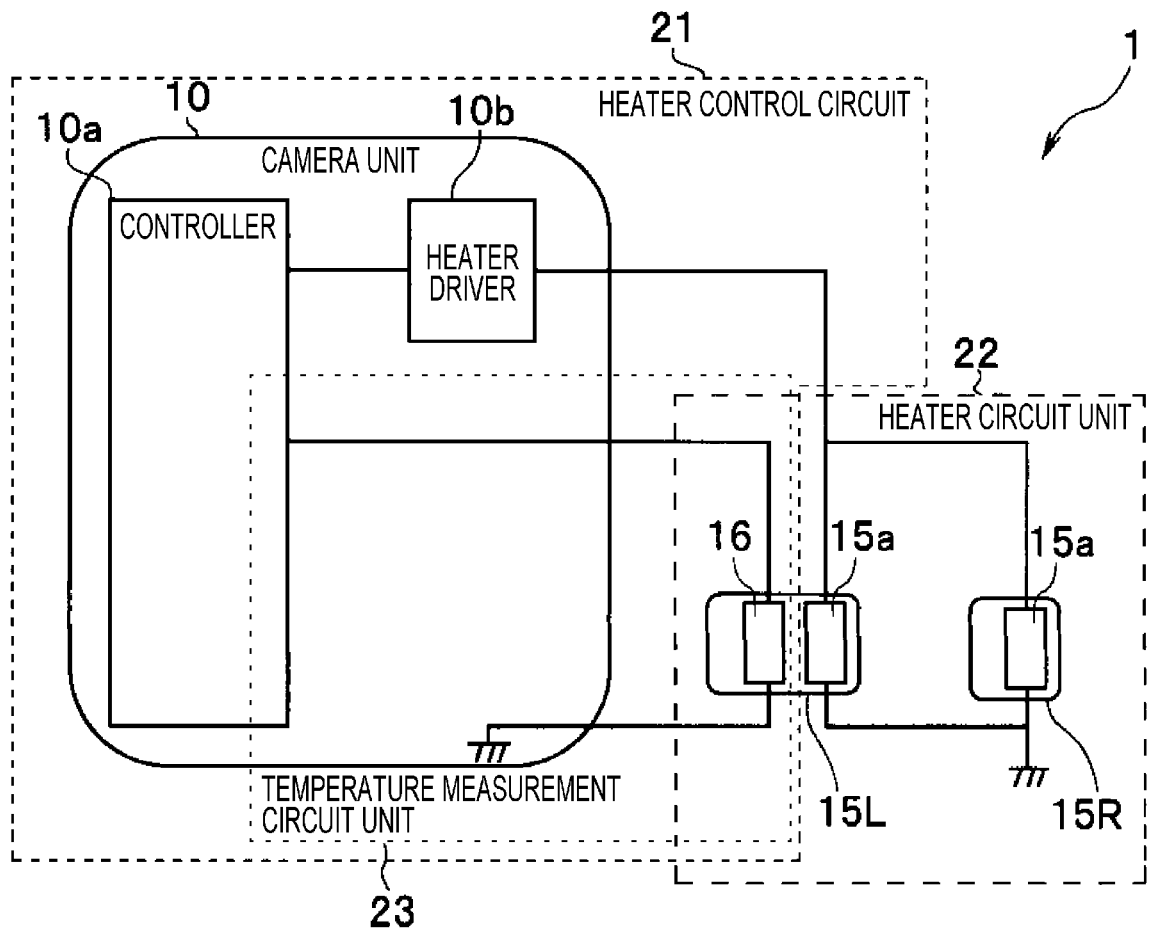
FIG. 4 is a block diagram indicating a general electrical configuration of the on-board camera device according to an embodiment of the disclosure.
Figure 5:
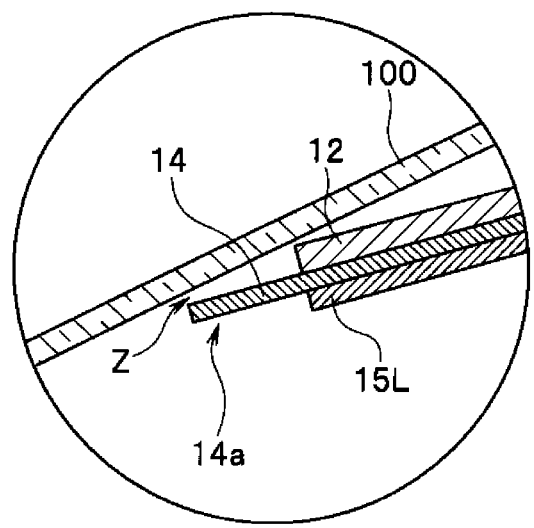
FIG. 5 is a partially enlarged view of the region indicated by the arrow V in FIG. 3.

FIG. 1 and FIG. 2 each illustrate a general configuration of an on-board camera device according to an embodiment of the disclosure. FIG. 1 is a schematic front perspective view of the on-board camera device according to the embodiment. FIG. 2 is a schematic perspective view of the on-board camera device according to the embodiment as viewed from the bottom surface side (in the arrow II direction in FIG. 1). FIG. 3 is a partially enlarged sectional view of a section of an imaginary plane (the plane indicated by the two-dot chain line) in FIG. 1 as viewed in the arrow III direction. FIG. 4 is a block diagram indicating a general electrical configuration of the on-board camera device according to an embodiment of the disclosure. FIG. 5 is a partially enlarged view of the region indicated by the arrow V in FIG. 3.

As illustrated in, for example, FIG. 1 and FIG. 2, in a configuration example, an on-board camera device 1 according to an embodiment of the disclosure is fixed to a window glass 100 of a vehicle, for example, to the inner surface of a windshield. In a configuration example, the on-board camera device 1 presented as an example in the embodiment is fixed on the interior side of the vehicle to a portion that is on the inner surface side of the windshield and close to a ceiling at a substantially center part of the vehicle.

The on-board camera device 1 according to the embodiment includes, as illustrated in, for example, FIG. 1 to FIG. 3, and FIG. 5, a camera unit 10 (10L, 10R), a lens hood 12 (hood member), a mounting bracket 13 (fixing member), a thermally conductive member 14, a heater device 15 (15L, 15R), a temperature sensor 16 (temperature measurement element), and, as illustrated in FIG. 4, a heater control circuit 21, a heater circuit unit 22, a temperature measurement circuit unit 23, and the like.

The camera unit 10 is a constituent device that captures an image of an ambient environment through the window glass 100 of a vehicle. In the embodiment, the camera unit 10 is illustrated as a stereo camera unit including a plurality of camera units (10L and 10R).

That is, the on-board camera device 1 according to the embodiment includes two camera units (the left camera unit 10L and the right camera unit 10R). These two camera units 10L and 10R are arranged to be separated from each other by a predetermined distance in the horizontal direction. These two camera units 10L and 10R constitute a stereo camera unit that forms a stereoscopic image of an identical object to be imaged on the basis of two pieces of image data obtained by simultaneously imaging the object to be imaged.

Each of the camera units 10L and 10R includes, in addition to an imaging lens 11 that optically forms a subject image, various constituent members (not illustrated) described below. Those are, for example, a photoelectric transducer (for example, a CCD (charge coupled device) image sensor, a CMOS (complementary metal oxide semiconductor) image sensor, and the like; hereinafter referred to as an imaging element) that generates image data by receiving and photoelectrically converting light of an optical image of a subject formed by the imaging lens 11; an image-signal processing circuit that performs required signal processing of various types with respect to the image data acquired by the imaging element; a storage medium that stores processed data output from the signal processing circuit, as data (for example, image data indicating a still image or a moving image) in a predetermined form; and an image display device (for example, a liquid crystal display (LCD) device, an organic electro-luminescence (organic EL; OEL) display device, and the like) that displays a still image or a moving image on the basis of the image data that has been acquired by the imaging element and subjected to predetermined signal processing.

These constituent members are configurations substantially identical to the configurations of an imaging device (camera device) in an existing general form. Therefore, the camera unit 10 (10L, 10R) is considered to have a configuration substantially identical to the configuration of a camera device in an existing general form, and description of the detailed configuration thereof is omitted.

The lens hood 12 is a hood member that has a function of blocking, with respect to the imaging lens 11 of each of the camera units 10L and 10R, an unnecessary light beam from outside the imaging view of each of the imaging lenses 11 and suppressing background reflection on the window glass 100 at the front part of the imaging lenses 11. The leading end surface of the lens hood 12 is thus disposed at a position close to the window glass 100. Consequently, the lens hood 12 forms a substantially sealed space between the imaging lenses 11 and the window glass 100.

In the embodiment, the lens hood 12 that is formed to be integrally formed to a housing that houses the camera units 10L and 10R and covers the outside of the camera units is presented as an example. The lens hood 12 may be permanently affixed to the housing or detachable from the housing. Alternatively, the lens hood 12 may be configured as, for example, a lens hood formed separately from a housing member of the camera units.

The mounting bracket 13 is a fixing member for fixing an assembly of the on-board camera device 1 to a predetermined portion of a surface of the window glass 100 of the vehicle.

The thermally conductive member 14 is fixed to be in close contact with and cover, of the outer surface of the lens hood 12, for example, the bottom-surface-side outer face of the lens hood 12 and is disposed such that a partial region thereof is in thermal contact with the window glass 100.

In one example, with a one-side edge 14a (refer to FIG. 3) of the thermally conductive member 14 being disposed near the window glass 100, the thermally conductive member 14 is in thermal contact with the window glass 100 such that the heat generated from heating wires 15a (described later) of the heater device 15 is transmitted to the window glass 100 through the thermally conductive member 14.

The thermally conductive member 14 may be simply disposed such that a partial region thereof is in thermal contact with the window glass 100. Thus, in the configuration example illustrated in FIG. 3, the one-side edge 14a, which is a portion of the thermally conductive member 14, is disposed near the window glass 100 and is in a non-contact state with respect to the window glass 100. With such a configuration, a small gap Z (refer to FIG. 3) is generated between the inner surface of the window glass 100 and the distal end part of the one-side edge 14a of the thermally conductive member 14. The gap Z ensures circulation of air into the substantially sealed space formed by the lens hood 12.

As a form that differs from this configuration example, the thermally conductive member 14 may be disposed such that the one-side edge 14a of the thermally conductive member 14 is in contact with the inner surface of the window glass 100.

Figure 6:
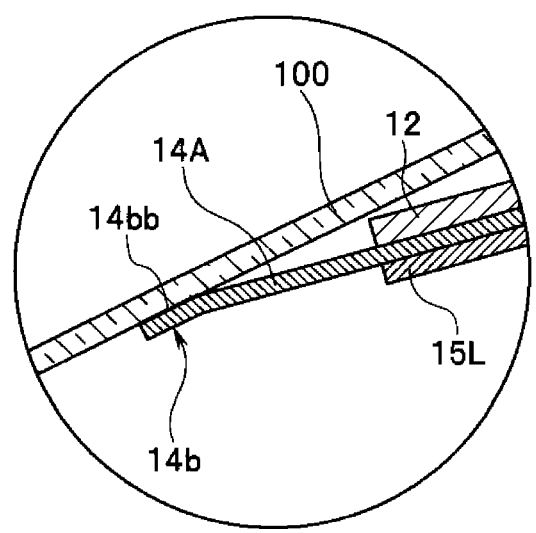
FIG. 6 is a partially enlarged view of a modification of the on-board camera device according to the embodiment of the disclosure.

For example, FIG. 6 illustrates a modification of the on-board camera device according to an embodiment of the disclosure and is a partially enlarged view in which a region corresponding to the region indicated by the arrow V in FIG. 3. is enlarged and illustrated.

In the modification illustrated in FIG. 6, a form in which a portion of a thermally conductive member 14A is in contact with the window glass 100 is illustrated.

In the modification, the thermally conductive member 14A includes an extension portion 14b that extends along the inner surface of the window glass 100. One face of the extension portion 14b is disposed in surface contact with the inner surface of the window glass 100. In FIG. 6, a contact region between the window glass 100 and the extension portion 14b is indicated by the sign 14bb.

With such a configuration, the thermally conductive member 14A is disposed in thermal contact with the window glass 100. The other configurations are the same as those in the embodiment.

In an embodiment described above, the gap Z is provided to thereby form an air circulation passage into the substantially sealed space of the lens hood 12. As a different form of the air circulation passage, the configuration illustrated in FIG. 7 is also conceivable.

Figure 7:
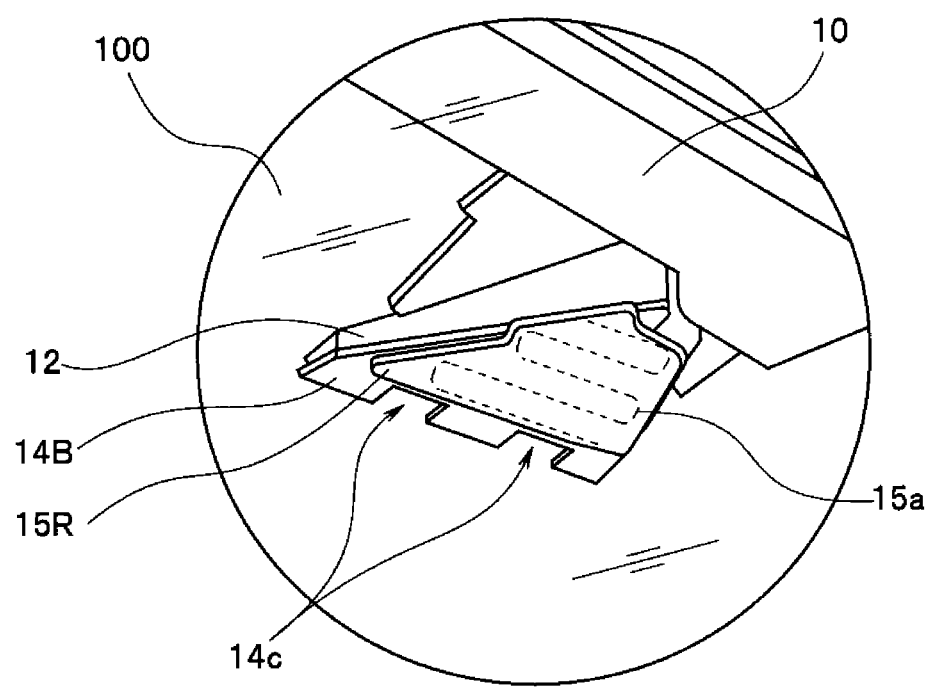
FIG. 7 is a partially enlarged view of another modification of the on-board camera device according to the embodiment of the disclosure.

FIG. 7 illustrates another modification of the on-board camera device according to an embodiment of the disclosure and is a partially enlarged view in which a region corresponding to the region indicated by the arrow VII in FIG. 2 is enlarged and illustrated.

In the other modification illustrated in FIG. 7, a plurality of notches 14c are formed at a part (one side edge) of a thermally conductive member 14B disposed near the window glass 100. In this case, the thermally conductive member 14B and the window glass 100 may be in a non-contact state or in a contact state. Although an example in which a plurality of the notches 14c are provided is presented here, the same function is ensured with at least one notch 14c.

As the thus configured thermally conductive member 14, a plate-shaped member made of a highly thermally conductive material, for example, an aluminum material, or the like is employed. The thermally conductive member 14 may have a higher thermal conductivity than a part of the lens hood 12 adjacent to the thermally conductive member 14. The thermally conductive member 14 may be formed of a thermally conductive material which has a higher thermal conductivity than a thermal conductivity of a material that forms at least a part of the lens hood 12 adjacent to the thermally conductive member 14.

The heater device 15 is a constitutional unit that is fixed to the outer surface of the thermally conductive member 14 to be in contact therewith and contributes to the defogging function of removing dew condensation and fog adhering to the surface of the window glass 100 at the front part (of the imaging lenses 11) of the camera units 10L and 10R.

A configuration example in which the on-board camera device 1 according to the embodiment includes the two camera units 10L and 10R is illustrated. Thus, the heater device 15 is also mounted to each of the camera units 10L and 10R. That is, a configuration in which the left heater device 15L and the right heater device 15R are mounted to the left camera unit 10L and the right camera unit 10R, respectively, is illustrated. In the following description, when the left and right heater devices are not intended to be distinguished, the left and right heater devices are simply referred to as the heater device 15.

The heater device 15 includes the heating wires 15a, and each heating wire 15a is driven by the heater circuit unit 22. The heater circuit unit 22 is controlled by the heater control circuit 21.

The heater control circuit 21 includes a controller 10a, a heater driver 10b, and the like that are included in each of the camera units 10L and 10R.

The heater device 15 includes the temperature sensor 16, which is the temperature measurement element, in the inner portion thereof. In the embodiment, a configuration example in which the temperature sensor 16 is provided at one (for example, the left heater device 15L, as illustrated in, for example, FIG. 2 and FIG. 4) of the two heater devices (15L and 15R) is illustrated.

The temperature sensor 16 is provided at a substantially center part of the left heater device 15L, and a portion thereof is disposed in contact with the thermally conductive member 14. Consequently, the temperature sensor 16 is able to detect the temperature state of the heating wire 15a of the left heater device 15L during the operation of the heater device 15L and detect the temperature state of the window glass 100 transmitted through the thermally conductive member 14 during the non-operation of the left heater device 15L.

As illustrated in FIG. 4, the temperature sensor 16 constitutes the temperature measurement circuit unit 23, which is a circuit that differs from the heater circuit unit 22 that drives the heater device 15, and is able to operate as an individual temperature measurement device. As the temperature sensor 16, for example, a thermistor or the like is employed.

An effect of the thus configured on-board camera device 1 according to the embodiment will be roughly described below. First, at the time of cold start of the vehicle and during the non-operation of the heater device 15 of the on-board camera device 1, the temperature measurement circuit unit 23 outputs a detection result of the temperature sensor 16 to the controller 10a. At this time, the temperature sensor 16 detects the temperature state of the window glass 100 through the thermally conductive member 14.

The controller 10a evaluates a possibility of generation of dew condensation, fog, and the like on the window glass 100 on the basis of the detection result (window glass temperature) of the temperature sensor 16 and a detection result (vehicle interior temperature) from the other temperature sensor (not illustrated) that measures the temperature of the vehicle interior.

As a result, for example, when the detection result of the temperature sensor 16 is determined to be less than or equal to a predetermined threshold, it is judged that the window glass 100 is cold. Consequently, it is judged that the possibility of generation of dew condensation, fog, and the like on the window glass 100 is high. In this case, the controller 10a performs turn-on control of the heater driver 10b, sends a turn-on signal to the heater circuit unit 22, and starts driving control of the heater device 15. Consequently, the heater device 15 is operated.

When the heater device 15 enters an operating state, the temperature measurement circuit unit 23 detects the temperature state of the heating wire 15a of the left heater device 15L. A detection result of the temperature sensor 16 is output to the controller 10a, similarly to that during the non-operation of the heater device 15. In response to this, the controller 10a performs turn-on/off control of the heater driver 10b in accordance with the detection result of the temperature sensor 16 and controls the driving state of the heater device 15. For example, when the detection result of the temperature sensor 16 is determined here to be more than a predetermined threshold, it is judged that the heater device 15 is in an overheated state, and turn-off control of the heater driver 10b is performed.

When the heater device 15 enters an operating state, the heat generated from the heating wires 15a of the heater device 15 is transmitted to the window glass 100 through the thermally conductive member 14. Consequently, dew condensation, fog, and the like generated on the window glass 100 are removed.

As described above, the on-board camera device 1 according to an embodiment described above includes the camera unit 10 that captures an image of an ambient environment through the window glass 100 of the vehicle; the lens hood 12 (hood member) that blocks an unnecessary light beam from outside the imaging view of the imaging lens 11 of the camera unit 10 and suppresses background reflection on the window glass 100; the thermally conductive member 14 that is made of a highly thermally conductive material and that is fixed to the outer surface of the lens hood 12 (hood member) to be in thermal contact with the window glass 100; the heater device 15 that is in contact with and fixed to the outer surface of the thermally conductive member 14 and has the defogging function of removing dew condensation, fog, and the like adhering to the surface of the window glass 100 at the front part of the camera unit 10; and the temperature sensor 16 (temperature measurement element) provided at the substantially center part of the heater device 15 and including the portion disposed in contact with the thermally conductive member 14. The temperature sensor 16 (temperature measurement element) detects the temperature state of the heater device 15 during the operation of the heater device 15 and detects the temperature state of the window glass 100 transmitted through the thermally conductive member 14 during the non-operation of the heater device 15.

In short, in the thus configured on-board camera device 1, the temperature sensor 16 is mounted to the heater device 15, and the temperature sensor 16 is used for both of temperature measurement of the window glass 100 and temperature measurement of the heater device 15. In this case, the temperature sensor 16 is provided on the heater device 15 and disposed in thermal contact with the window glass 100.

With such a configuration, the on-board camera device 1 according to the embodiment is able to measure the temperature state of the window glass 100 during the non-operation of the heater device 15 and measure the temperature state of the heater device 15 during the operation of the heater device 15 by using the single temperature sensor 16 disposed at the position away from the window glass 100.

Since it is possible to measure the temperature state of the window glass 100 during the non-operation of the heater device 15, the temperature state can be used as information for judgement whether dew condensation, fog, and the like are generated on the window glass 100. In addition, since it is possible to measure the temperature state of the heater device 15 during the operation of the heater device 15, overheating monitoring control of the heater device 15 can be performed accurately.

In addition, since it is possible to realize these with the single temperature sensor 16, it is possible to contribute to a reduction in the number of components and contribute to a reduction in the manufacturing costs.

Since it is possible to measure the temperature state of the window glass 100, unnecessary driving control with respect to the heater device 15 can be suppressed. Therefore, it is possible to reduce exhaustion of the heater driver 10b.

For example, in a situation in which the on-board camera device 1 receives direct sunlight through the window glass, the lens hood 12 may have been overheated. Even in such a case, according to the configuration of the embodiment, the temperature sensor 16 can detect the temperature state of the lens hood 12 and thus can avoid unnecessary operation of the heater device 15.

When only image information is used to determine dew condensation, fog, and the like generated on a glass, it is difficult to determine whether dew condensation, fog, and the like are generated on the glass or the environment outside the vehicle is mist. In such a situation, temperature measurement information can be used in addition to image information in the configuration according to the embodiment. It is thus possible to determine fog on the glass with increased reliability and accuracy.

In the embodiment, as described above, a configuration example in which the on-board camera device 1 is constituted by the stereo camera unit is presented. However, the disclosure is not limited to the configuration example presented in an embodiment described above. For example, the disclosure is applicable even to an on-board camera device constituted by a monocular camera unit in exactly the same manner.

In the embodiment, a configuration example in which the window glass 100 at which the on-board camera device 1 is installed is a windshield is presented. This example is, however, a non-limiting example. For example, the on-board camera device 1 may be an on-board camera device to be installed at a rear glass.

In the present embodiment, the thermally conductive member may include a portion disposed in contact with the window glass.

The thermally conductive member may have at least one notch or a plurality of notches at a part disposed in contact with the window glass.

The thermally conductive member may have, at a part disposed in contact with the window glass, an extension portion that extends along the surface of the window glass, and the surface of the extension portion may be in surface contact with the surface of the window glass.

The temperature measurement element may be a thermistor.

The disclosure is not limited to the above-described embodiment. It is needless to say that various modifications and applications can be made without departing from the gist of the disclosure. The aforementioned embodiment includes disclosures at various stages, and various disclosures may be extracted by appropriately combining a plurality of disclosed constituent elements. For example, even when some constituent elements are deleted from all of the constituent elements described in an embodiment described above, a configuration in which the constituent elements have been deleted may be extracted as a disclosure. Components in different embodiments may be combined together, as appropriate. Other than being limited by the attached claims, the disclosure is not restricted by a specific embodiment thereof.

The disclosure provides an on-board camera device that is to be mounted in a vehicle and captures an image through a window glass, that has a defogging function of removing dew condensation, fog, and the like adhering to a glass surface at a camera front part, and that is capable of confirming the temperature state of the window glass of the vehicle and the temperature state of the on-board camera device by using a single temperature sensor and capable of contributing to a reduction in manufacturing costs.

The invention claimed is:

1. An on-board camera device comprising:
   a camera unit configured to capture an image of an ambient environment through a window glass of a vehicle and a space, the window glass being located in a first direction with respect to an imaging lens of the camera unit, the space being located between the imaging lens of the camera unit and the window glass;
   a hood configured to block an unnecessary light beam from outside of an imaging view of the imaging lens of the camera unit and suppress background reflection on the window glass, the hood comprising a plate-like portion separated from the window glass, the plate-like portion comprising a first surface facing the space and a second surface opposite to the first surface;
   a thermally conductive part comprising a highly thermally conductive material, the thermally conductive part including a third surface that is in direct surface contact with the second surface of the plate-like portion and a fourth surface opposite to the third surface, the thermally conductive part comprising a protruding portion that protrudes in the first direction from a leading edge of the plate-like portion with respect to the first direction, the protruding portion being in thermal contact with the window glass;
   a heater device that is fixed in direct contact with the fourth surface of the thermally conductive part and includes a defogging function of removing dew condensation and fog adhering to a surface of the window glass at a front part of the camera unit; and
   a temperature measurement sensor that is provided at a substantially center part of the heater device and comprises a portion that is disposed in direct contact with the fourth surface of the thermally conductive part,
   wherein the temperature measurement sensor is configured to:
      detect a temperature state of the heater device during operation of the heater device; and
      detect a temperature state of the window glass transmitted through the thermally conductive part during non-operation of the heater device,
   wherein the heater device is controlled according to the temperature state of the heater device and the temperature state of the window glass detected from the temperature measurement sensor, and
   wherein the heater device is disposed on the fourth surface to cover an area of the fourth surface surrounding a portion of the fourth surface that is in direct contact with the temperature measurement sensor,
   wherein the thermally conductive part has a plate-shape and comprises an aluminum material,
   wherein the protruding portion is in direct contact with the window glass.

2. The on-board camera device according to claim 1, wherein the protruding portion is adjacent to the window glass, and
   wherein the temperature measurement sensor continuously measures over time a temperature of the window glass and provides measured temperatures of the window glass to a controller to control the heater device.

3. The on-board camera device according to claim 2, wherein the protruding portion comprises at least one notch or a plurality of notches.

4. The on-board camera device according to claim 2, wherein the thermally conductive part has a plate-shape and comprises an aluminum material.

5. The on-board camera device according to claim 3, wherein the thermally conductive part has a plate-shape and comprises an aluminum material.

6. The on-board camera device according to claim 1, further comprising a controller,
   wherein the controller is configured to:
      perform, when determining that temperature detected by the temperature measurement sensor is less than or equal to a predetermined threshold, turn-on control of the heater device to cause the heater device to drive; and
      perform, when determining that the temperature detected by the temperature measurement sensor is more than the predetermined threshold, turn-off control of the heater device to cause the heater device to stop.

7. The on-board camera device according to claim 2, further comprising a controller,
   wherein the controller is configured to:
      perform, when determining that temperature detected by the temperature measurement sensor is less than or equal to a predetermined threshold, turn-on control of the heater device to cause the heater device to drive; and
      perform, when determining that the temperature detected by the temperature measurement sensor is more than the predetermined threshold, turn-off control of the heater device to cause the heater device to stop.

8. The on-board camera device according to claim 3, further comprising a controller,
   wherein the controller is configured to:
      perform, when determining that temperature detected by the temperature measurement sensor is less than or equal to a predetermined threshold, turn-on control of the heater device to cause the heater device to drive; and
      perform, when determining that the temperature detected by the temperature measurement sensor is more than the predetermined threshold, turn-off control of the heater device to cause the heater device to stop.

9. The on-board camera device according to claim 1, further comprising a controller,
wherein the controller is configured to:
perform, when determining that temperature detected by the temperature measurement sensor is less than or equal to a predetermined threshold, turn-on control of the heater device to cause the heater device to drive; and
perform, when determining that the temperature detected by the temperature measurement sensor is more than the predetermined threshold, turn-off control of the heater device to cause the heater device to stop.

10. The on-board camera device according to claim 4, further comprising a controller,
wherein the controller is configured to:
perform, when determining that temperature detected by the temperature measurement sensor is less than or equal to a predetermined threshold, turn-on control of the heater device to cause the heater device to drive; and
perform, when determining that the temperature detected by the temperature measurement sensor is more than the predetermined threshold, turn-off control of the heater device to cause the heater device to stop,
wherein the protruding portion is in direct mechanical contact with the window glass, or
the protruding portion is in direct thermal contact with the window glass where the protruding portion and window glass are in close proximity without any material other than air between them.

11. An on-board camera device comprising:
a camera unit configured to capture an image of an ambient environment through a window glass of a vehicle and a space, the window glass being located in a first direction with respect to an imaging lens of the camera unit, the space being located between the imaging lens of the camera unit and the window glass;
a hood configured to block an unnecessary light beam from outside of an imaging view of the imaging lens of the camera unit and suppress background reflection on the window glass, the hood comprising a plate-like portion separated from the window glass, the plate-like portion comprising a first surface facing the space and a second surface opposite to the first surface;
a thermally conductive part comprising a highly thermally conductive material, the thermally conductive part including a third surface that is in direct surface contact with the second surface of the plate-like portion and a fourth surface opposite to the third surface, the thermally conductive part comprising a protruding portion that protrudes in the first direction from a leading edge of the plate-like portion with respect to the first direction, the protruding portion being in thermal contact with the window glass;
a heater device that is fixed in direct contact with the fourth surface of the thermally conductive part and includes a defogging function of removing dew condensation and fog adhering to a surface of the window glass at a front part of the camera unit; and
a temperature measurement sensor that is provided at a substantially center part of the heater device and comprises a portion that is disposed in direct contact with the fourth surface of the thermally conductive part,
wherein the temperature measurement sensor is configured to:
detect a temperature state of the heater device during operation of the heater device; and
detect a temperature state of the window glass transmitted through the thermally conductive part during non-operation of the heater device,
wherein the heater device is controlled according to the temperature state of the heater device and the temperature state of the window glass detected from the temperature measurement sensor,
wherein the heater device is disposed on the fourth surface to cover an area of the fourth surface surrounding a portion of the fourth surface that is in direct contact with the temperature measurement sensor,
wherein the protruding portion is adjacent to the window glass,
wherein the temperature sensor continuously measures over time a temperature of the window glass and provides measured temperatures of the window glass to a controller to control the heater device,
wherein the protruding portion comprises at least one notch or a plurality of notches, and
wherein the thermally conductive part has a plate-shape and comprises an aluminum material,
further comprising a controller,
wherein the controller is configured to:
perform, when determining that temperature detected by the temperature measurement sensor is less than or equal to a predetermined threshold, turn-on control of the heater device to cause the heater device to drive; and
perform, when determining that the temperature detected by the temperature measurement sensor is more than the predetermined threshold, turn-off control of the heater device to cause the heater device to stop,
wherein the protruding portion is in direct thermal contact with the window glass by facing the window glass with a gap between them.

12. The on-board camera device according to claim 1, wherein the protruding portion is in surface contact with the window glass.

13. The on-board camera device according to claim 12, wherein the protruding portion comprises at least one notch or a plurality of notches,
wherein the protruding portion is in direct contact with the window glass, and
wherein the protruding portion is in direct thermal contact with the window glass by facing the window glass with a gap between them.

14. An on-board camera device comprising:
a camera unit configured to capture an image of a front of a vehicle through a windshield of the vehicle;
a first plate-like member located in front of and below an imaging lens of the camera unit and spaced apart from the windshield, the first plate-like member comprising a first surface facing upward and a second surface facing downward;
a second plate-like member comprising an aluminum material and located on the second surface to cover the second surface, the second plate-like member comprising a body portion and a protruding portion that protrudes forward from a front end of the body portion, the body portion comprising a third surface that is in direct contact with the second surface and a fourth surface opposite to the third surface, a front end of the protruding portion being located forward of a front end of the first plate-like member, the protruding portion being in thermal contact with the windshield;

a temperature sensor located on the fourth surface, the temperature sensor being in direct contact with the fourth surface at a first area of the fourth surface; and a heater located on the fourth surface, the heater being in direct contact with the fourth surface at a second area of the fourth surface, the second area surrounding the first area, and wherein the protruding portion is in surface contact with the windshield, wherein the protruding portion is in direct contact with a window glass.

15. The on-board camera device according to claim 14, wherein the protruding portion comprises at least one notch or a plurality of notches.

16. The on-board camera device according to claim 14, further comprising a controller configured to control the heater based only on a temperature detected by the temperature sensor.

17. The on-board camera device according to claim 16, wherein the controller is configured to:

perform, when determining that the detected temperature is less than or equal to a predetermined threshold, turn-on control of the heater to cause the heater to drive; and perform, when determining that the detected temperature is more than the predetermined threshold, turn-off control of the heater to cause the heater to stop, wherein the protruding portion is in direct mechanical contact with the window glass, or the protruding portion is in direct thermal contact with the window glass where the protruding portion and window glass are in close proximity without any material other than air between them.

18. The on-board camera device according to claim 14, wherein the first plate-like member comprises a plastic material, wherein the protruding portion is in direct thermal contact with the window glass by facing the window glass with a gap between them.

* * * * *